(12) United States Patent
Tanaka (10) Patent No.: US 8,279,725 B2
(45) Date of Patent: Oct. 2, 2012

(54) CONTROL DEVICE, CONTROL METHOD, PROGRAM, AND RECORDING MEDIUM

(75) Inventor: Norio Tanaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 122 days.

(21) Appl. No.: 12/483,655

(22) Filed: Jun. 12, 2009

(65) Prior Publication Data

US 2010/0020658 A1    Jan. 28, 2010

(30) Foreign Application Priority Data

Jul. 23, 2008   (JP) ................................. 2008-189393

(51) Int. Cl.
*G11B 7/004*   (2006.01)
(52) U.S. Cl. .................................... 369/44.37
(58) Field of Classification Search .......... None
See application file for complete search history.

(56) References Cited

U.S. PATENT DOCUMENTS 5,457,670 A * 10/1995 Maeda et al. ............. 369/44.28

FOREIGN PATENT DOCUMENTS

| JP | 3-125329 | 5/1991 |
|---|---|---|
| JP | 11-167762 | 6/1999 |
| JP | 11-238302 | 8/1999 |
| JP | 2002-208168 | 7/2002 |
| JP | 2002-208173 | 7/2002 |
| JP | 2005-166147 | 6/2005 |

OTHER PUBLICATIONS

Office Action issued Feb. 9, 2012 in Japanese Patent Application No. 2008-189393.

* cited by examiner

*Primary Examiner* — Wayne Young
*Assistant Examiner* — Brian Butcher
(74) *Attorney, Agent, or Firm* — Oblon, Spivak, McClelland, Maier & Neustadt, L.L.P.

(57) ABSTRACT

A control device includes n optical pickups, n being an integer greater than one; a dividing unit configured to divide one block into n pieces of data, the one block being a predetermined amount of data; and a control unit configured to control the n optical pickups to record the n pieces of data obtained by the dividing unit on a predetermined recording medium.

8 Claims, 11 Drawing Sheets

CONTROL DEVICE, CONTROL METHOD, PROGRAM, AND RECORDING MEDIUM

BACKGROUND OF THE INVENTION

1. Field of the Invention

The present invention relates to control devices, control methods, programs, and recording media. In particular, the present invention relates to a control device and a control method for enabling high-speed recording and reproduction to and from a predetermined disc, a program causing the control device to perform the control method, and a recording medium recording the program.

2. Description of the Related Art

With recent advances in digital video equipment and techniques for providing high-definition (HD) images, various apparatuses capable of processing such high-definition images have been becoming available. At the same time, there have been techniques for providing analog and standard-definition (SD) images (referred to as "low-definition images" in contrast to high-definition images) and apparatuses for processing such low-definition images. There is a demand from users to enjoy both high-definition and low-definition images. In response, techniques for meeting such a demand are being developed. With this as a backdrop, it is desirable to provide a technique in which cost-oriented low-transfer-rate images and quality-oriented high-transfer-rate images can be handled by the same equipment or medium (see, e.g., Japanese Unexamined Patent Application Publication No. 2004-185715).

Techniques for recording and reproducing high-quality image data are becoming widespread. The amount of such high-quality image data tends to be large. Thus, since the amount of data written to a predetermined disc during recording is large, it is necessary to quickly write the data to the disc. For high-speed data writing, there is a proposed technique in which the recording speed is increased by increasing the number of revolutions of a spindle of a disc.

However, increasing the number of revolutions of the spindle increases the level of noise of the rotating spindle. As a result, the noise may be recorded on the video camera. Therefore, it is not preferable to use the technique in which, in the recording apparatus, the recording speed is increased by increasing the number of revolutions of the spindle. Also, increasing the recording speed by increasing the number of revolutions of the spindle is not preferable, because there are limitations in recording rate associated with characteristics of the disc medium, limitations in processing capacity of a large-scale integrated circuit (LSI) for signal processing, and physical limitations in rotating the disc at high speed.

SUMMARY OF THE INVENTION

As another technique for increasing the recording and reproduction speed without increasing the number of revolutions of a disc, there is a proposed technique in which the number of channels used for recording and reproduction is increased. For example, to increase the transfer rate by increasing the number of channels, a dual spiral method or a recording format which enables higher efficiency during multi-channel recording is used. With these techniques, however, it is difficult to provide both an inexpensive single-channel drive having low transfer rate performance and a high-performance multi-channel drive. In other words, when data recorded on a medium for use in an apparatus which usually performs recording and reproduction on two channels is reproduced on one channel, the data, which has been recorded on the premise that it is reproduced on two channels, may not be accurately reproduced.

The present invention has been made in view of the circumstances described above. It is desirable to provide a technique which not only enables multi-channel recording and reproduction, but also allows data to be recorded such that it can be handled even by an apparatus not supporting multi-channel mode, and thereby allows the user to enjoy both high-definition and low-definition images.

A control device according to an embodiment of the present invention includes n optical pickups, n being an integer greater than one; dividing means for dividing one block into n pieces of data, the one block being a predetermined amount of data; and control means for controlling the n optical pickups to record the n pieces of data obtained by the dividing means on a predetermined recording medium.

The control means may perform control such that the optical pickup that has recorded one of the n pieces of data, the one being located at the end of the one block, records a piece of data located at the beginning of the subsequent block in a continuous manner.

The letter n may be an integer of two, and two optical pickups may be mounted on one optical head.

The letter n may be an integer of four, and two optical heads, on each of which two optical pickups are mounted, may be arranged at positions facing each other.

According to another embodiment of the present invention, a control method for controlling a control device that controls n optical pickups, n being an integer greater than one, includes the steps of dividing one block into n pieces of data, the one block being a predetermined amount of data; and controlling the n optical pickups to record the n pieces of data on a predetermined recording medium.

According to another embodiment of the present invention, a computer-readable program causes a control device that controls n optical pickups, n being an integer greater than one, to execute processing including the steps of dividing one block into n pieces of data, the one block being a predetermined amount of data; and controlling the n optical pickups to record the n pieces of data on a predetermined recording medium.

According to another embodiment of the present invention, a recording medium records a computer-readable program causing a control device that controls n optical pickups, n being an integer greater than one, to execute processing including the steps of dividing one block into n pieces of data, the one block being a predetermined amount of data; and controlling the n optical pickups to record the n pieces of data on a predetermined recording medium.

In the control device, control method, program, and recording medium according to the embodiments of the present invention, n optical pickups, n being an integer greater than one, write a predetermined amount of data on a predetermined recording medium. At least one of the n optical pickups performs writing while the other optical pickups are performing seek operations.

According to the embodiments of the present invention, it is possible not only to enable multi-channel recording and reproduction, but also to allow data to be recorded such that it can be handled even by an apparatus not supporting multi-channel mode.

DESCRIPTION OF THE PREFERRED EMBODIMENTS

Hereinafter, embodiments of the present invention will be described with reference to the drawings.

First Embodiment

Figure 1:
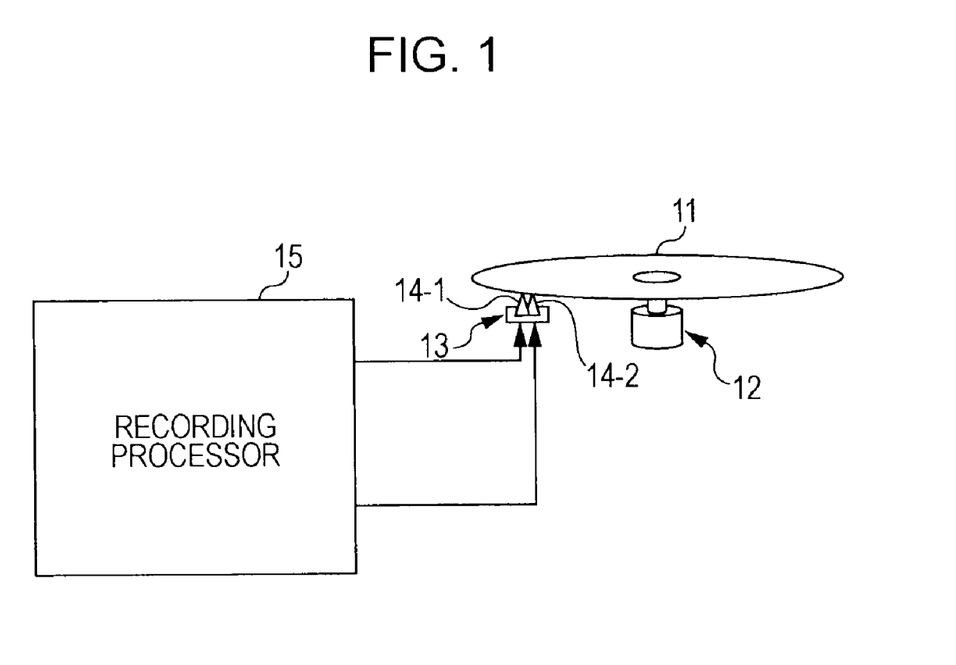
FIG. 1 illustrates a configuration of an embodiment of a drive apparatus to which the present invention is applied.

FIG. 1 illustrates a configuration of an embodiment of a drive apparatus including a control device to which the present invention is applied. The drive apparatus illustrated in FIG. 1 drives a disc 11, which is a predetermined disc. For example, the disc 11 is a digital versatile disc (DVD) or a blu-ray disc (BD). The drive apparatus includes a spindle motor 12, an optical head 13, an optical pickup 14-1, an optical pickup 14-2, and a recording processor 15.

Hereinafter, when it is not necessary to distinguish between the optical pickups 14-1 and 14-2, they will be simply referred to as optical pickups 14. Other parts will also be referred to in this manner.

The drive apparatus illustrated in FIG. 1 has a configuration in which the one optical head 13 is provided with the two optical pickups 14-1 and 14-2. This configuration will be referred to as a "one-head two-pickup" assembly.

Figure 2:
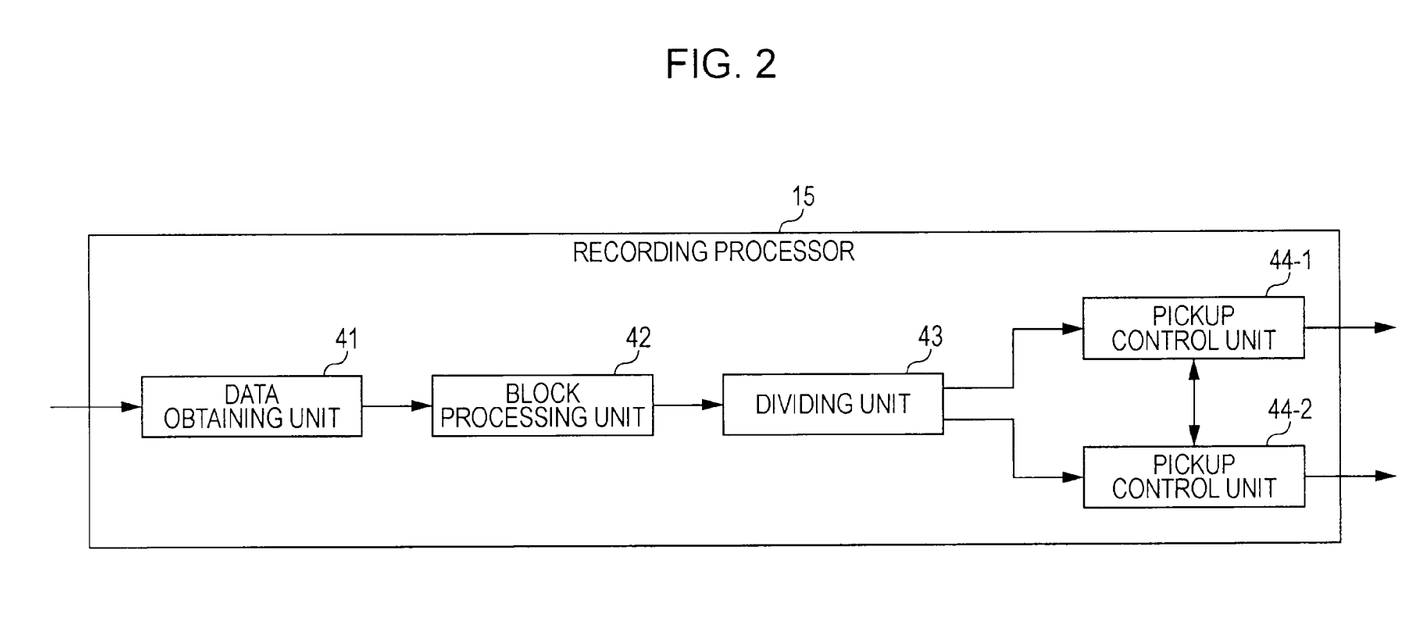
FIG. 2 illustrates an example of an internal configuration of a recording processor.

FIG. 2 illustrates an example of an internal configuration of a recording processor 15 for the drive apparatus having a "one-head two-pickup" assembly. The recording processor 15 includes a data obtaining unit 41, a block processing unit 42, a dividing unit 43, a pickup control unit 44-1, and a pickup control unit 44-2.

The data obtaining unit 41 obtains data that is, for example, supplied from a host central processing unit (CPU) (not shown) and to be recorded on the disc 11. The block processing unit 42 has an internal storage that stores a predetermined amount of data. This predetermined amount of data to be stored in this internal storage is referred to as a block. For example, one block is equivalent to two seconds of video data.

The dividing unit 43 divides one block into two pieces of data. As illustrated in FIG. 1, the drive apparatus includes the two optical pickups 14. The two optical pickups 14-1 and 14-2 record data on the disc 11. That is, one block is recorded by the optical pickups 14-1 and 14-2. For this, the dividing unit 43 divides one block of data into two pieces, one to be written by the optical pickup 14-1 and the other to be written by the optical pickup 14-2.

The pickup control unit 44-1 controls the optical pickup 14-1, and the pickup control unit 44-2 controls the optical pickup 14-2. Of the two pieces of data obtained by the dividing unit 43, one piece of data to be written by the optical pickup 14-1 is supplied to the pickup control unit 44-1 and the other piece of data to be written by the optical pickup 14-2 is supplied to the pickup control unit 44-2.

The pickup control units 44-1 and 44-2 each include a servo controller (not shown). Since it is necessary that the optical head 13 be controlled by one of the pickup control units 44-1 and 44-2, the servo controller of one of the pickup control units 44-1 and 44-2 controls, for example, a slider for the optical head 13.

Also, since it is necessary that the spindle motor 12 be controlled by one of the pickup control units 44-1 and 44-2, one of the pickup control units 44-1 and 44-2 controls the spindle motor 12.

Thus, when it is necessary that the optical pickups 14-1 and 14-2 operate in cooperation, the pickup control units 44-1 and 44-2 are configured to share (i.e., communicate to send and receive) information for the cooperative operation.

Figure 3:
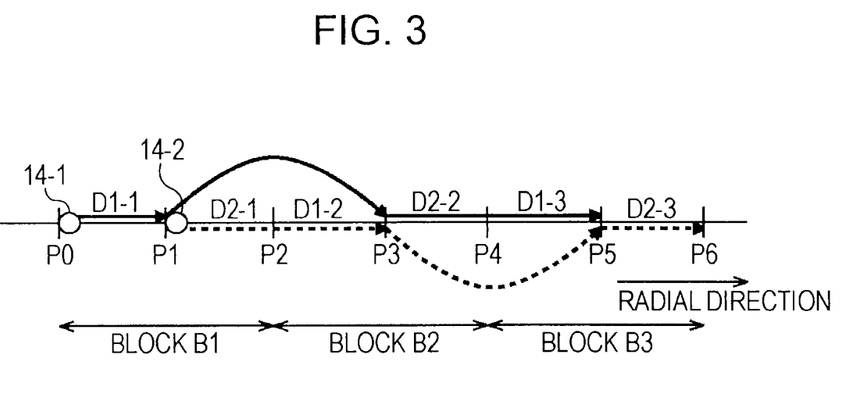
FIG. 3 illustrates a recording operation.

FIG. 3 illustrates how data is recorded by the optical pickups 14-1 and 14-2. The horizontal direction in FIG. 3 corresponds to the radial direction of the disc 11. A block B1 contains data D1-1 and data D2-1, a block B2 contains data D1-2 and data D2-2, and a block B3 contains data D1-3 and data D2-3.

The data D1-1 constituting the first half of the block B1 is written by the optical pickup 14-1 to the disc 11. The data D2-1 constituting the second half of the block B1 is written by the optical pickup 14-2 to the disc 11. Then, the data D1-2 constituting the first half of the block B2 is also written by the optical pickup 14-2 to the disc 11. After a seek operation of the optical pickup 14-1, the data D2-2 constituting the second half of the block B2 is written by the optical pickup 14-1 to the disc 11.

While the optical pickup 14-2 is continuously writing the data D2-1 and the data D1-2 to the disc 11, the optical pickup 14-1 writes the data D1-1 to the disc 11, performs a seek operation to reach position P3 of the data D2-2, and starts writing the data D2-2 to the disc 11.

After the data D2-2 is written to the disc 11, the data D1-3 constituting the first half of the block B3 is also written by the optical pickup 14-1 to the disc 11. After a seek operation of the optical pickup 14-2, the data D2-3 constituting the second half of the block B3 is written by the optical pickup 14-2 to the disc 11.

While the optical pickup 14-1 is continuously writing the data D2-2 and the data D1-3 to the disc 11, the optical pickup 14-2 writes the data D1-2 to the disc 11, performs a seek operation to reach position P5 of the data D2-3, and starts writing the data D2-3 to the disc 11.

Thus, the optical pickup 14-1 writes the data D1-1 from position P0 to position P1 on the disc 11, moves to position P3, and continuously writes the data D2-2 and the data D1-3 from position P3 to position P5. The optical pickup 14-2 continuously writes the data D2-1 and the data D1-2 from position P1 to position P3 on the disc 11, moves to position P5, and writes the data D2-3 and data D1-4 (not shown) from position P5 to position P7 (not shown).

Figure 4:
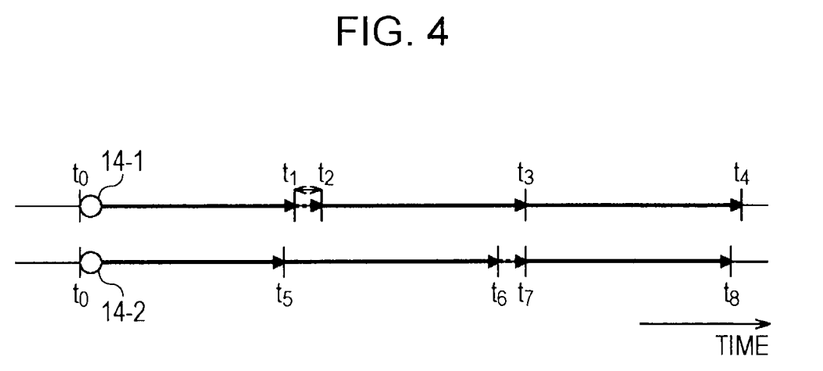
FIG. 4 also illustrates the recording operation of FIG. 3.

A further description will be given with reference to FIG. 4. The horizontal direction in FIG. 4 represents passage of time. At time t0, the optical pickups 14-1 and 14-2 both start writing data. The optical pickup 14-1 continues writing until time t1 and performs a seek operation from time t1 to time t2. The optical pickup 14-2 performs writing during that time and continues writing until time t6. Thus, during the seek operation of the optical pickup 14-1, the optical pickup 14-2 continues performing the write operation.

The optical pickup 14-2 performs writing from time t0 to time t6 and performs a seek operation from time t6 to time t7. The optical pickup 14-1 performs writing during that time and continues writing until time t4. Thus, during the seek operation of the optical pickup 14-2, the optical pickup 14-1 continues performing the write operation.

As described with reference to FIG. 3 and FIG. 4, while one of the optical pickups 14 is performing a seek operation, the other optical pickup 14 continues performing a write operation. Therefore, it is possible to prevent the situation where a seek operation interrupts a write operation. Thus, data can be efficiently written to the disc 11 at high speed.

Figure 5:
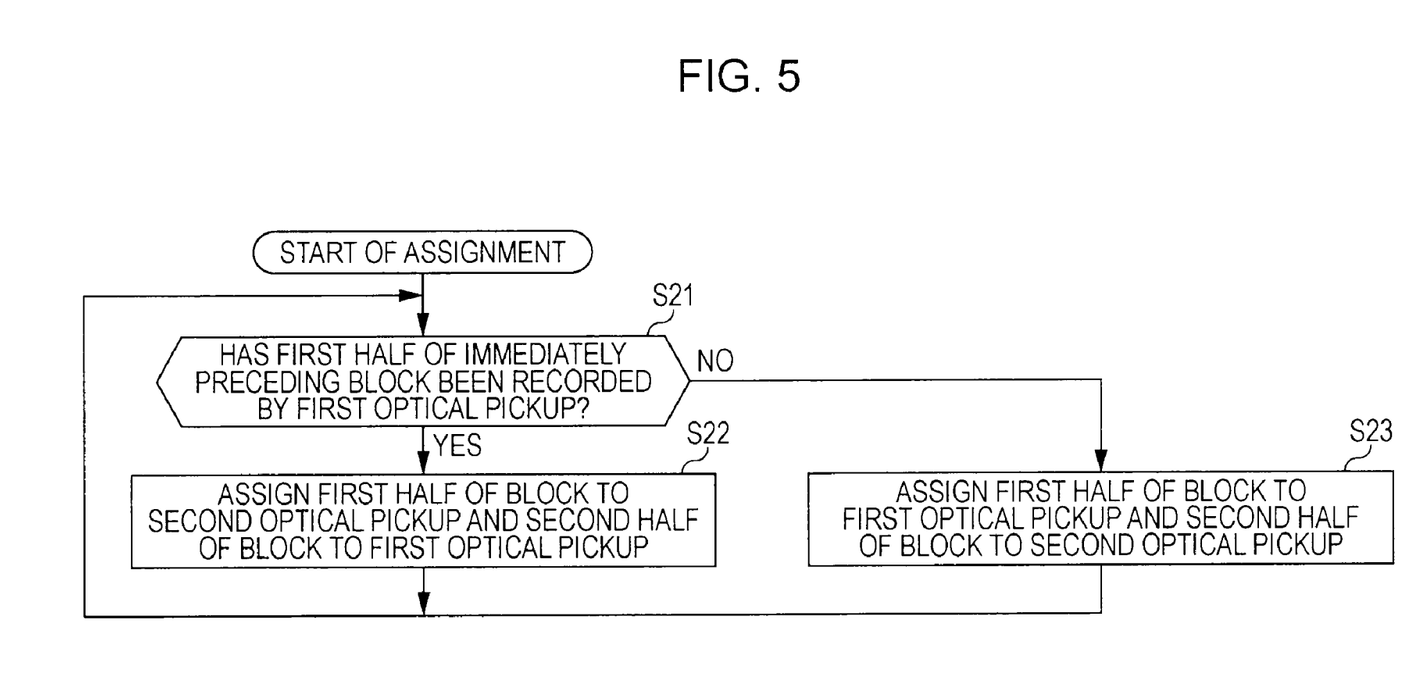
FIG. 5 is a flowchart illustrating a recording operation.

FIG. 5 is a flowchart illustrating an operation of the recording processor 15 which causes a write operation to be executed. The processing of the flowchart of FIG. 5 is mainly executed by the dividing unit 43 of the recording processor 15. The processing of the flowchart of FIG. 5 is executed when a predetermined amount of data, such as two seconds of video data, is accumulated in the block processing unit 42.

In step S21, the dividing unit 43 determines whether the first half of an immediately preceding block has been recorded by a first optical pickup. Here, the first optical pickup corresponds to the optical pickup 14-1, and a second optical pickup (described below) corresponds to the optical pickup 14-2.

With reference back to FIG. 3, the processing of step S21 in FIG. 5 will be further described. When the block B2 is a block to be written, its immediately preceding block is the block B1. The first half of the block B1, that is, the data D1-1 is written by the optical pickup 14-1 (first optical pickup). In this case, it is determined in step S21 of FIG. 5 that the first half of the immediately preceding block has been recorded by the first optical pickup (YES in step S21). Then, the processing proceeds to step S22.

In step S22, the first half of the block to be written is assigned to the second optical pickup, and the second half of the block to be written is assigned to the first optical pickup. Then, these pieces of assigned data are supplied to the corresponding pickup control units 44-1 and 44-2. The pickup control units 44-1 and 44-2 control the optical pickups 14-1 and 14-2, respectively, to cause them to write the pieces of assigned data to the disc 11.

Referring back to FIG. 3, when the block B2 is a block to be written, the first half of the block B2, that is, the data D1-2 is assigned as data to be written by the optical pickup 14-2 (second optical pickup), while the second half of the block B2, that is, the data D2-2 is assigned as data to be written by the optical pickup 14-1 (first optical pickup).

In accordance with this assignment, as described with reference to FIG. 3, the optical pickups 14-1 and 14-2 perform the following operations. That is, after writing the data D1-1, the optical pickup 14-1 performs a seek operation to write the assigned data D2-2, whereas after writing the data D2-1, the optical pickup 14-2 also writes the assigned data D1-2.

If it is determined in step S21 of FIG. 5 that the first half of the immediately preceding block has not been recorded by the first optical pickup (NO in step S21), the processing proceeds to step S23. In step S23, the first half of the block to be written is assigned to the first optical pickup, and the second half of the block to be written is assigned to the second optical pickup. Then, these pieces of assigned data are supplied to the corresponding pickup control units 44-1 and 44-2. The pickup control units 44-1 and 44-2 control the optical pickups 14-1 and 14-2, respectively, to cause them to write the pieces of assigned data to the disc 11.

Referring back to FIG. 3, when the block B3 is a block to be written, the first half of the block B3, that is, the data D1-3 is assigned as data to be written by the optical pickup 14-1 (first optical pickup), while the second half of the block B3, that is, the data D2-3 is assigned as data to be written by the optical pickup 14-2 (second optical pickup).

In accordance with this assignment, as described with reference to FIG. 3, the optical pickups 14-1 and 14-2 perform the following operations. That is, after writing the data D2-2, the optical pickup 14-1 also writes the assigned data D1-3, whereas after writing the data D1-2, the pickup 14-2 performs a seek operation to write the assigned data D2-3.

The data recorded as described above can be reproduced either by a "one-head two-pickup" apparatus or a "one-head one-pickup" apparatus. When a "one-head two-pickup" apparatus is used for reproduction, the recorded data can be quickly read and reproduced by performing processing similar to that for the recording described above. That is, the recorded data can be read at high speed by performing control such that while one pickup is performing a seek operation, the other pickup continues performing a read operation.

The recording method described above is not a format-dependent method in which, for example, a recording format which enables higher efficiency during multi-channel recording is used. Therefore, the data recorded on the disc 11 by the method described above can be reproduced without problems by a "one-head one-pickup" apparatus.

Figure 6:
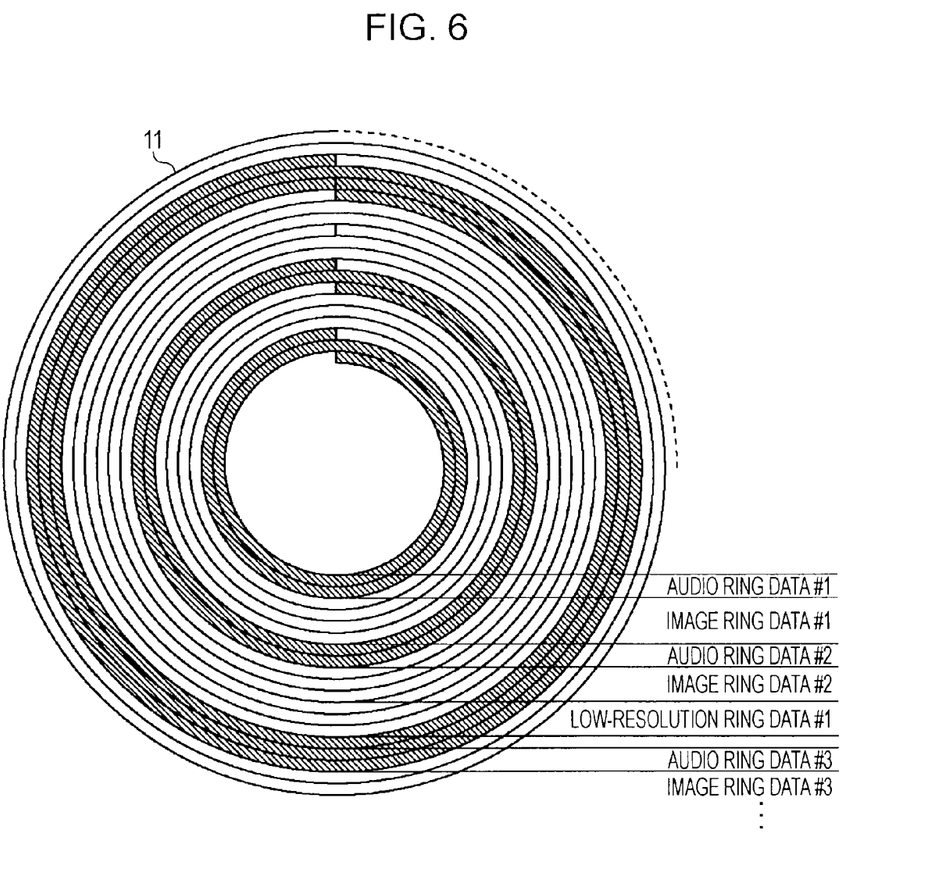
FIG. 6 illustrates a data structure.

The data recorded by the method described above may have a data structure illustrated in FIG. 6. Data recorded on the disc 11 illustrated in FIG. 6 has a ring structure. In the direction from the inner radius to the outer radius of the disc 11, the following pieces of data are recorded in the following order: audio ring data #1, image ring data #1, audio ring data #2, image ring data #2, low-resolution ring data #1, meta ring data #1, audio ring data #3, image ring data #3, audio ring data #4, image ring data #4, low-resolution ring data #2, meta ring data #2, etc.

With this data structure, for example, when only one of the pieces of audio ring data, image ring data, low-resolution ring data, and meta ring data is necessary, it is possible to read only the necessary data without reading the other pieces of data. With this data structure, when two optical pickups 14 are used for recording as described above, high-speed data recording can be achieved. This data structure will not be described in detail here, as it is described in Japanese Unexamined Patent Application Publication No. 2004-185715 previously proposed by the present applicant.

Second Embodiment

The drive apparatus having one "one-head two-pickup" assembly has been described as an example in the first embodiment. In a second embodiment of the present invention, a drive apparatus having two "one-head two-pickup" assemblies will be described as an example.

Figure 7:
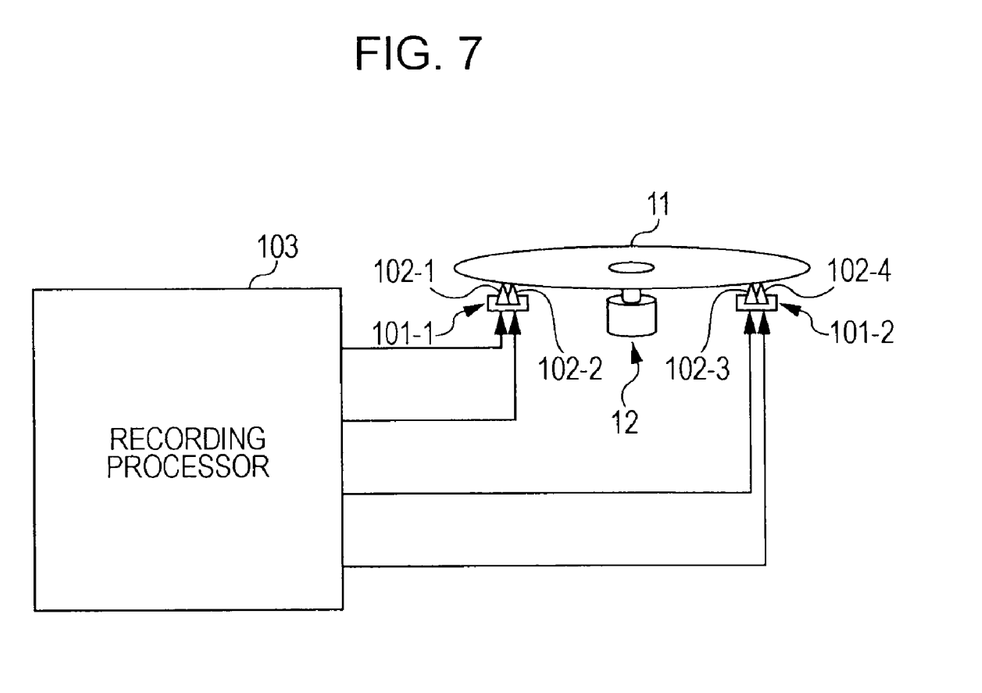
FIG. 7 illustrates a configuration of another drive apparatus to which the present invention is applied.

FIG. 7 illustrates a configuration of a drive apparatus having two "one-head two-pickup" assemblies. The drive apparatus illustrated in FIG. 7 includes the spindle motor 12, an optical head 101-1, an optical head 101-2, an optical pickup 102-1, an optical pickup 102-2, an optical pickup 102-3, an optical pickup 102-4, and a recording processor 103.

The drive apparatus illustrated in FIG. 7 includes the two optical heads 101-1 and 101-2. The optical head 101-1 is provided with the two optical pickups 102-1 and 102-2, and the other optical head 101-2 is provided with the two optical pickups 102-3 and 102-4. Thus, the drive apparatus illustrated in FIG. 7 is configured to have two "one-head two-pickup" assemblies.

Figure 8:
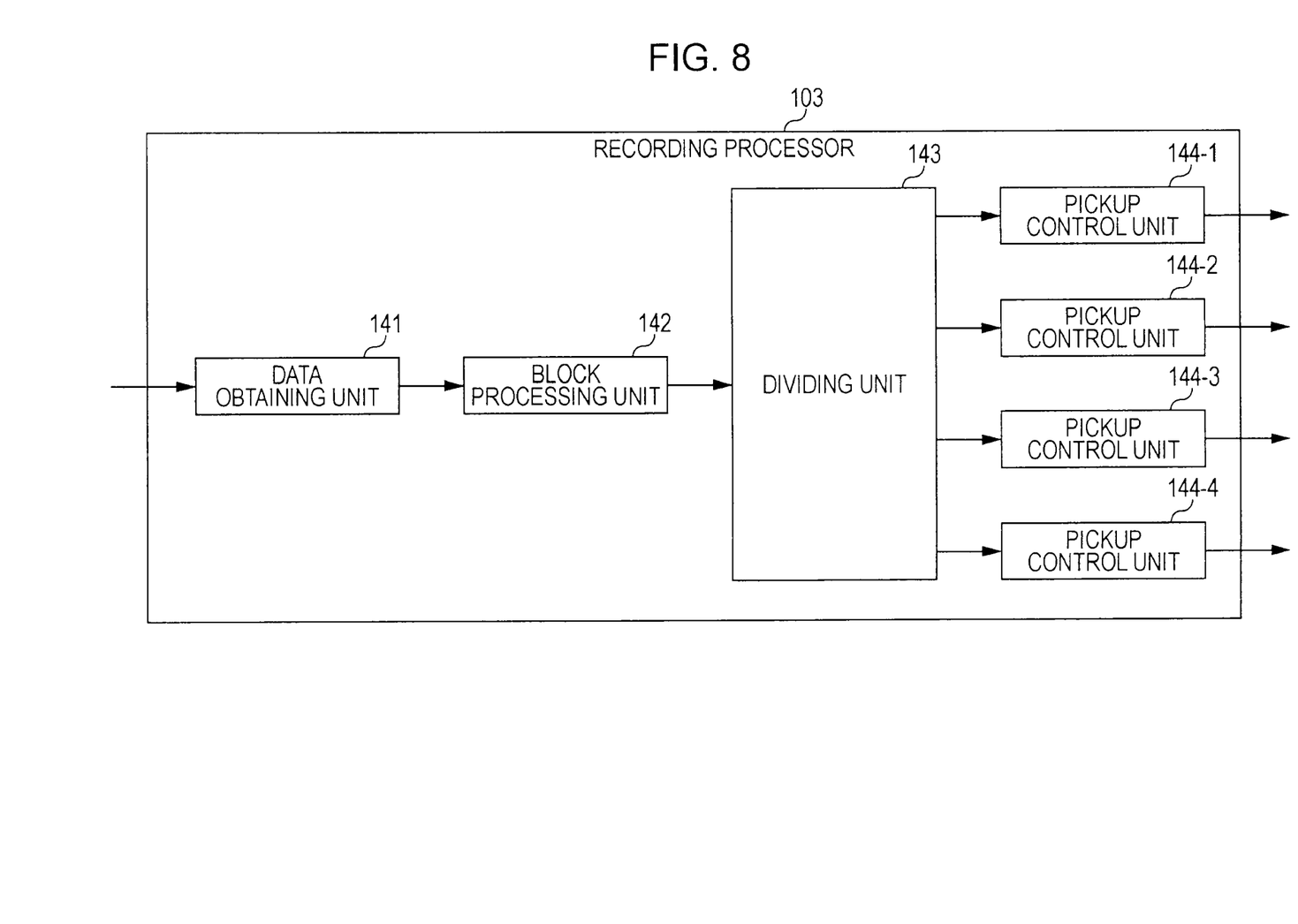
FIG. 8 illustrates an example of an internal configuration of a recording processor.

FIG. 8 illustrates an example of an internal configuration of the recording processor 103 for the drive apparatus having two "one-head two-pickup" assemblies. The recording processor 103 includes a data obtaining unit 141, a block processing unit 142, a dividing unit 143, a pickup control unit 144-1, a pickup control unit 144-2, a pickup control unit 144-3, and a pickup control unit 144-4.

Like the data obtaining unit 41 illustrated in FIG. 1, the data obtaining unit 141 obtains data that is, for example, supplied from a host CPU (not shown) and to be recorded on the disc 11. Like the block processing unit 42 illustrated in FIG. 1, the block processing unit 142 has an internal storage that stores a predetermined amount of data. This predetermined amount of data to be stored in this internal storage is at least one block of data, which is equivalent to, for example, two seconds of video data.

Like the dividing unit 43 illustrated in FIG. 1, the dividing unit 143 divides one block into a plurality of pieces of data. Since there are four optical pickups 102, the dividing unit 143 divides one block into four pieces of data, unlike the dividing unit 43 illustrated in FIG. 1.

The pickup control unit 144-1 controls the optical pickup 102-1, the pickup control unit 144-2 controls the optical pickup 102-2, the pickup control unit 144-3 controls the optical pickup 102-3, and the pickup control unit 144-4 controls the optical pickup 102-4. Of the four pieces of data obtained by the dividing unit 143, one piece of data to be written by the optical pickup 102-1 is supplied to the pickup control unit 144-1, one piece of data to be written by the optical pickup 102-2 is supplied to the pickup control unit 144-2, one piece of data to be written by the optical pickup 102-3 is supplied to the pickup control unit 144-3, and one piece of data to be written by the optical pickup 102-4 is supplied to the pickup control unit 144-4.

One of the pickup control units 144-1 to 144-4 controls the spindle motor 12. One of the pickup control units 144-1 and 144-2 controls a slider for the optical head 101-1. One of the pickup control units 144-3 and 144-4 controls a slide for the optical head 101-2.

Thus, when it is necessary that the optical pickups 102-1 to 102-4 operate in cooperation, the pickup control units 144-1 to 144-4 are configured to share (i.e., communicate to send and receive) information for the cooperative operation.

Figure 9:
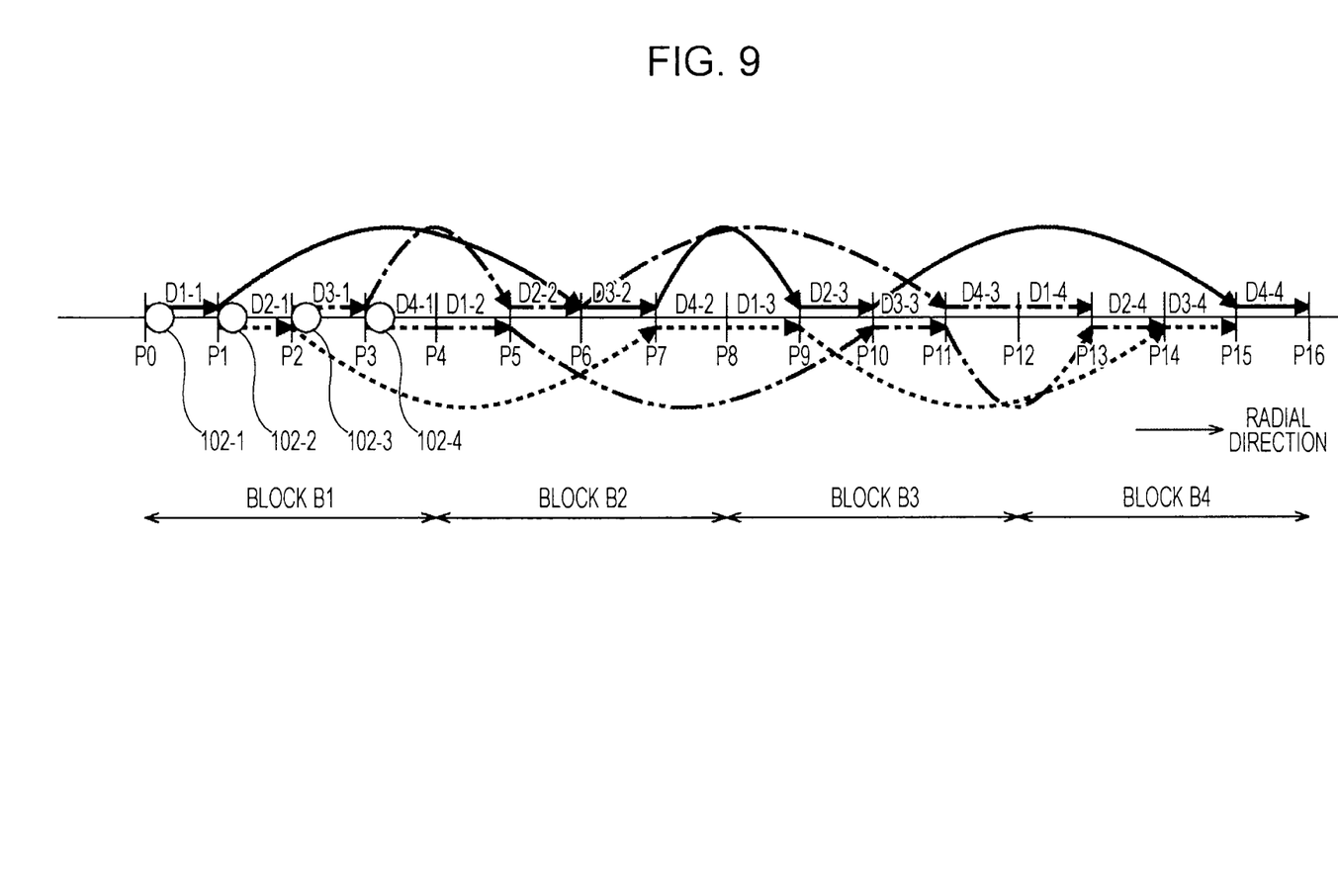
FIG. 9 illustrates a recording operation.

FIG. 9 illustrates how data is recorded by the optical pickups 102-1 to 102-4. The horizontal direction in FIG. 9 corresponds to the radial direction of the disc 11. A block B1 contains data D1-1, data D2-1, data D3-1, and data D4-1. Similarly, a block B2 contains data D1-2, data D2-2, data D3-2, and data D4-2. A block B3 contains data D1-3, data D2-3, data D3-3, and data D4-3. A block B4 contains data D1-4, data D2-4, data D3-4, and data D4-4.

The data D1-1 in the first half of the block B1 is written by the optical pickup 102-1 to the disc 11. The data D2-1 in the first half of the block B1 is written by the optical pickup 102-2 to the disc 11. The data D3-1 in the second half of the block B1 is written by the optical pickup 102-3 to the disc 11. The data D4-1 in the second half of the block B1 is written by the optical pickup 102-4 to the disc 11.

After the data D4-1 is written to the disc 11, the data D1-2 in the first half of the block B2 is also written by the optical pickup 102-4 to the disc 11. While the optical pickup 102-4 is continuously writing the data D4-1 and the data D1-2 to the disc 11, the optical pickup 102-1 writes the data D1-1 to the disc 11, performs a seek operation to reach position P6 of the data D3-2, and starts writing the data D3-2 to the disc 11.

Similarly, after writing the data D2-1 to the disc 11, the optical pickup 102-2 performs a seek operation to reach position P7 of the data D4-2, and starts writing the data D4-2 to the disc 11. Also, after writing the data D3-1 to the disc 11, the optical pickup 102-3 performs a seek operation to reach position P5 of the data D2-2, and starts writing the data D2-2 to the disc 11.

Thus, while at least one optical pickup 102 is continuously performing a write operation, the other optical pickups 102 perform seek operations and the subsequent write operations.

The pieces of data in the blocks B1 and B2 are thus written to the disc 11. The pieces of data in the blocks B3 and B4 are also written to the disc 11 by repeating operations similar to those described above.

The operations performed by each of the optical pickups 102 are as follows. The optical pickup 102-1 writes the data D1-1 from position P0 to position P1 on the disc 11, moves to position P6, writes the data D3-2 from position P6 to position P7, moves to position P9, writes the data D2-3 from position P9 to position P10, moves to position P15, and writes the data D4-4 from position P15 to position P16.

The optical pickup 102-2 writes the data D2-1 from position P1 to position P2 on the disc 11, moves to position P7, continuously writes the data D4-2 and the data D1-3 from position P7 to position P9, moves to position P14, and writes the data D3-4 from position P14 to position P15.

The optical pickup 102-3 writes the data D3-1 from position P2 to position P3 on the disc 11, moves to position P5, writes the data D2-2 from position P5 to position P6, moves to position P11, and continuously writes the data D4-3 and the data D1-4 from position P11 to position P13.

The optical pickup 102-4 continuously writes the data D4-1 and the data D1-2 from position P3 to position P5 on the disc 11, moves to position P10, writes the data D3-3 from position P10 to position P11, moves to position P13, and writes the data D2-4 from position P13 to position P14.

Figure 10:
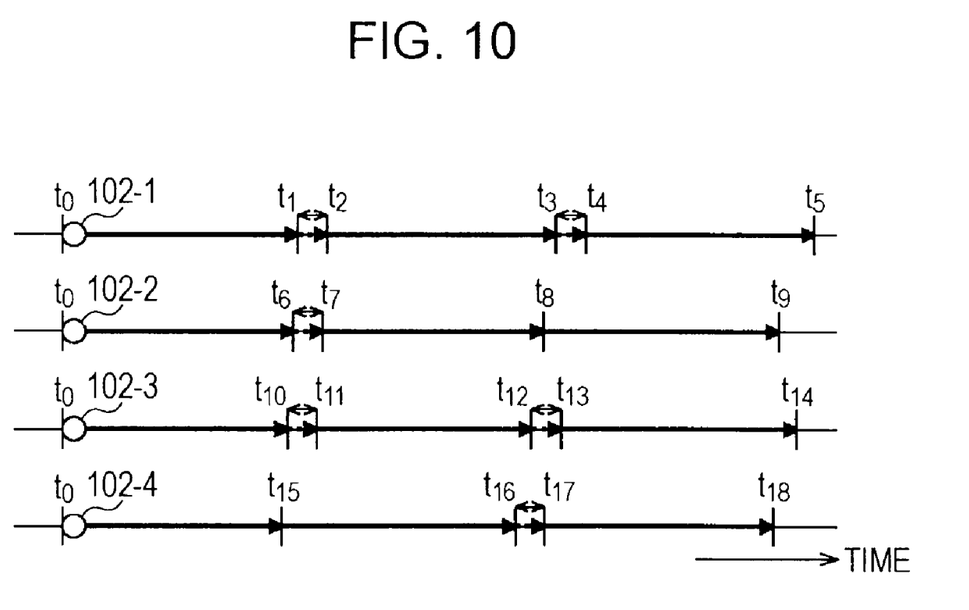
FIG. 10 also illustrates the recording operation of FIG. 9.

A further description will be given with reference to FIG. 10. The horizontal direction in FIG. 10 represents passage of time. At time t0, the optical pickups 102-1 to 102-4 simultaneously start writing data. The optical pickup 102-1 continues writing until time t1 and performs a seek operation from time t1 to time t2. The optical pickup 102-2 continues writing until time t6 and performs a seek operation from time t6 to time t7. The optical pickup 102-3 continues writing until time t10 and performs a seek operation from time t10 to time t11. While the seek operations described above are being performed by the optical pickups 102-1 to 102-3, the optical pickup 102-4 continues writing until time t16. Thus, during the seek operations of the optical pickups 102-1 to 102-3, the optical pickup 102-4 continues performing the write operation.

In the next stage, after completing the seek operation at time t2, the optical pickup 102-1 performs writing until time t3 and performs another seek operation from time t3 to time t4. After completing the seek operation at time t7, the optical pickup 102-2 performs writing continuously from time t7 to time t9. After completing the seek operation at time t11, the optical pickup 102-3 performs writing until time t12 and performs another seek operation from time t12 to time t13. After performing the writing until time t16, the optical pickup 102-4 performs a seek operation from time t16 to time t17. Thus, during the seek operations of the optical pickups 102-1, 102-3, and 102-4, the optical pickup 102-2 continues performing the write operation.

As described with reference to FIG. 9 and FIG. 10, while three or fewer optical pickups 102 are performing their seek operations, at least one optical pickup 102 continues performing a write operation. Therefore, it is possible to prevent the situation where a seek operation interrupts a write operation. Thus, data can be efficiently written to the disc 11 at high speed.

Figure 11:
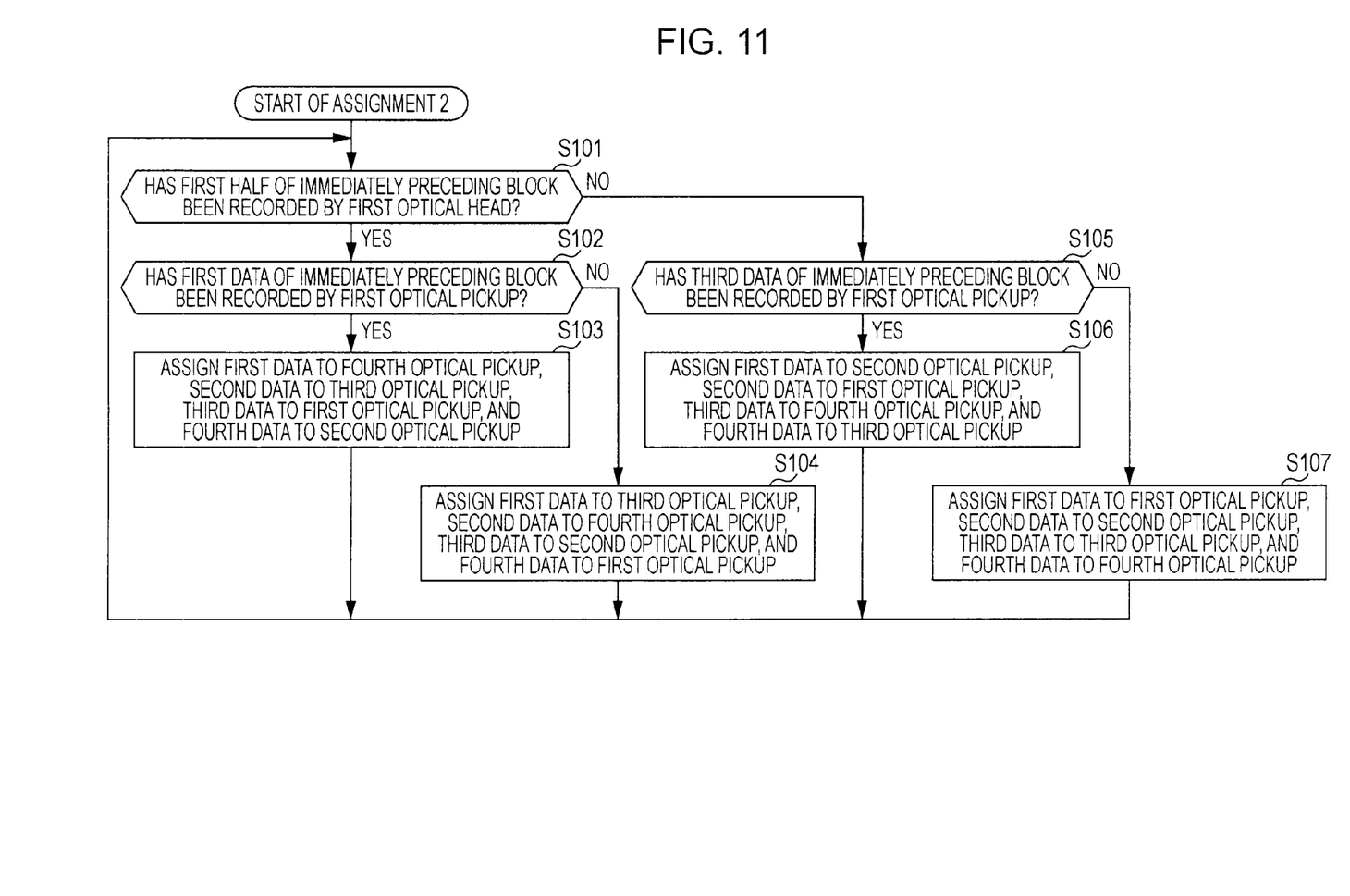
FIG. 11 is a flowchart illustrating a recording operation.

FIG. 11 is a flowchart illustrating an operation of the recording processor 103 which causes a write operation to be executed. The processing of the flowchart of FIG. 11 is mainly executed by the dividing unit 143 of the recording processor 103. The processing of the flowchart of FIG. 11 is executed when a predetermined amount of data, such as two seconds of video data, is accumulated in the block processing unit 142.

In step S101, the dividing unit 143 determines whether the first half of an immediately preceding block has been recorded by a first optical head. Here, the first optical head corresponds to the optical head 101-1, and a second optical head (described below) corresponds to the optical head 101-2. A first optical pickup corresponds to the optical pickup 102-1, a second optical pickup corresponds to the optical pickup 102-2, a third optical pickup corresponds to the optical pickup 102-3, and a fourth optical pickup corresponds to the optical pickup 102-4.

With reference back to FIG. 9, the processing of step S101 in FIG. 9 will be further described. When the block B2 is a block to be written, its immediately preceding block is the block B1. The first half of the block B1, that is, the data D1-1 and the data D2-1 are written by the optical head 101-1 (first optical head). In this case, it is determined in step S101 of FIG. 11 that the first half of the immediately preceding block has been recorded by the first optical head (YES in step S101). Then, the processing proceeds to step S102.

In step S102, a determination is made as to whether first data of the immediately preceding block has been recorded by the first optical pickup. Here, the first data is the first of four pieces of data obtained by dividing one block. For example, the first data corresponds to the data D1-1 of the block B1 in FIG. 9. Second data is the second piece of data in one block. For example, the second data corresponds to the data D2-1 of the block B1 in FIG. 9. Third data is the third piece of data in one block. For example, the third data corresponds to the data D3-1 of the block B1 in FIG. 9. Fourth data is the fourth piece of data in one block. For example, the fourth data corresponds to the data D4-1 of the block B1 in FIG. 9.

If it is determined in step S102 of FIG. 11 that the first data of the immediately preceding block has been recorded by the first optical pickup (YES in step S102), the processing proceeds to step S103. In step S103, first data of the block to be written is assigned to the fourth optical pickup, second data of the block to be written is assigned to the third optical pickup, third data of the block to be written is assigned to the first optical pickup, and fourth data of the block to be written is assigned to the second optical pickup. Then, these pieces of assigned data are supplied to the corresponding pickup control units 144-1 to 144-4. The pickup control units 144-1 to 144-4 control the optical pickups 102-1 to 102-4, respectively, to cause them to write the pieces of assigned data to the disc 11.

The processing in steps S101 to S103 will be described with reference again to FIG. 9. When the block B2 is a block to be written, its immediately preceding block is the block B1. The first data and the second data that constitute the first half of the block B1, that is, the data D1-1 and the data D2-1 are recorded by the optical head 101-1 (first optical head) on which the optical pickup 102-1 (first optical pickup) and the optical pickup 102-2 (second optical pickup) are mounted. Therefore, in step S101 of FIG. 11, it is determined that the first half of the immediately preceding block has been recorded by the first optical head (YES in step S101). Then, the processing proceeds to step S102.

In step S102, a determination is made as to whether the first data of the immediately preceding block has been recorded by the first optical pickup. Since the data D1-1 (first data) is recorded by the optical pickup 102-1 (first optical pickup) (YES in step S102), the processing proceeds to step S103.

In step S103, first, the first data is assigned to the fourth optical pickup. That is, in this case, since the first data of the block B2 is the data D1-2, the data D1-2 is assigned to the fourth optical pickup, that is, the optical pickup 102-4. Likewise, the data D2-2 is assigned to the optical pickup 102-3, the data D3-2 is assigned to the optical pickup 102-1, and the data D4-2 is assigned to the optical pickup 102-2.

In accordance with this assignment, as described with reference to FIG. 9, the optical pickups 102-1 to 102-4 perform the following operations. That is, after writing the data D1-1, the optical pickup 102-1 performs a seek operation to write the assigned data D3-2; after writing the data D2-1, the optical pickup 102-2 performs a seek operation to write the assigned data D4-2; after writing the data D3-1, the optical pickup 102-3 performs a seek operation to write the assigned data D2-2; and after writing the data D4-1, the optical pickup 102-4 continues performing the write operation to write the data D1-2.

Thus, the optical pickup 102 that has written the fourth data continues performing the write operation to write the first data of the subsequent block, whereas the optical pickups 102 that have written the respective pieces of first to third data individually perform seek operations to write the respective pieces of second to fourth data of the subsequent block.

Referring back to the flowchart of FIG. 11, if it is determined in step S102 that the first data of the immediately preceding block has not been recorded by the first optical pickup (NO in step S102), the processing proceeds to step S104.

In step S104, the first data is assigned to the third optical pickup, the second data is assigned to the fourth optical pickup, the third data is assigned to the second optical pickup, and the fourth data is assigned to the first optical pickup.

The processing in step S104 is performed when, for example in FIG. 9, the data of the block B4 is to be written. Since the data D1-3 (first data) of the block B3, which is immediately preceding the block B4, is recorded by the optical pickup 102-2 (second optical pickup) mounted on the optical head 101-1 (first optical head), the processing proceeds from step S101 to step S102 and then to step S104.

In step S104, the data D1-4 of the block B4 is assigned to the optical pickup 102-3, the data D2-4 is assigned to the optical pickup 102-4, the data D3-4 is assigned to the optical pickup 102-2, and the data D4-4 is assigned to the optical pickup 102-1.

Referring back to the flowchart of FIG. 11, if it is determined in step S101 that the first half of the immediately preceding block has not been recorded by the first optical head (NO in step S101), in other words, if it is determined in step S101 that the first half of the immediately preceding block has been recorded by the third or fourth optical pickup, the processing proceeds to step S105.

In step S105, a determination is made as to whether the third data of the immediately preceding block has been recorded by the first optical pickup. If it is determined in step S105 that the third data of the immediately preceding block has been recorded by the first optical pickup (YES in step S105), the processing proceeds to step S106.

In step S106, the first data is assigned to the second optical pickup, the second data is assigned to the first optical pickup, the third data is assigned to the fourth optical pickup, and the fourth data is assigned to the third optical pickup.

The processing in step S106 is performed when, for example in FIG. 9, the data of the block B3 is to be written.

Since the data D1-2 (first data) of the block B2, which is immediately preceding the block B3, is recorded by the optical pickup 102-4 (fourth optical pickup) mounted on the optical head 101-2 (second optical head), the processing proceeds from S101 to step S105. Then, since the data D3-2 (third data) of the block B2 is recorded by the optical pickup 102-1 (first optical pickup), the processing proceeds from step S105 to step S106.

In step S106, the data D1-3 of the block B3 is assigned to the optical pickup 102-2, the data D2-3 is assigned to the optical pickup 102-1, the data D3-3 is assigned to the optical pickup 102-4, and the data D4-3 is assigned to the optical pickup 102-3.

Referring back to the flowchart of FIG. 11, if it is determined in step S105 that the third data of the immediately preceding block has not been recorded by the first optical pickup (NO in step S105), the processing proceeds to step S107.

In step S107, the first data is assigned to the first optical pickup, the second data is assigned to the second optical pickup, the third data is assigned to the third optical pickup, and the fourth data is assigned to the fourth optical pickup.

The processing in step S107 is performed when, for example in FIG. 9, data of the block B5 (not shown) is to be written. Since the data D1-4 (first data) of the block B4, which is immediately preceding the block B5, is recorded by the optical pickup 102-3 (third optical pickup) mounted on the optical head 101-2 (second optical head), the processing proceeds from S101 to step S105. Then, since the data D3-4 (third data) of the block B4 is recorded by the optical pickup 102-2 (second optical pickup), the processing proceeds from step S105 to step S107.

In step S107, data D1-5 (not shown) of the block B5 is assigned to the optical pickup 102-1, data D2-5 (not shown) is assigned to the optical pickup 102-2, data D3-5 (not shown) is assigned to the optical pickup 102-3, and data D4-5 (not shown) is assigned to the optical pickup 102-4.

As described above, the optical pickup 102 that has written the fourth data continues performing the write operation to write the first data of the subsequent block. The other optical pickups 102 that have written the respective pieces of first to third data individually perform seek operations to write the respective pieces of second to fourth data of the subsequent block. Thus, even during seek operations, at least one of the optical pickups 102 continues performing a write operation. This can increase the speed of writing data to the disc 11.

The data recorded in the above-described manner can be reproduced not only by an apparatus having two "one-head two-pickup" assemblies, but also by an apparatus having one "one-head two-pickup" assembly or one "one-head one-pickup" assembly. An apparatus having one or two "one-head two-pickup" assemblies can read and reproduce data at high speed by performing processing similar to that for the recording described above. That is, high-speed reading can be achieved by performing control such that during a seek operation of at least one predetermined optical pickup, the other optical pickups continue reading.

The above embodiments have described examples where the number of optical pickups is two or four. However, the present invention is not limited to the case where the number of optical pickups is two or four. The present invention is applicable to the case where the number of optical pickups is n, which is an integer greater than one. When n optical pickups are provided, one block is divided into n pieces of data, which are written to the disc by their corresponding optical pickups.

The series of processing steps described above may be executed by hardware or software. When the series of processing steps described above is executed by software, a program constituting the software is installed from a program recording medium onto a computer included in dedicated hardware or onto, for example, a multi-purpose personal computer capable of executing various functions by installing various programs.

Figure 12:
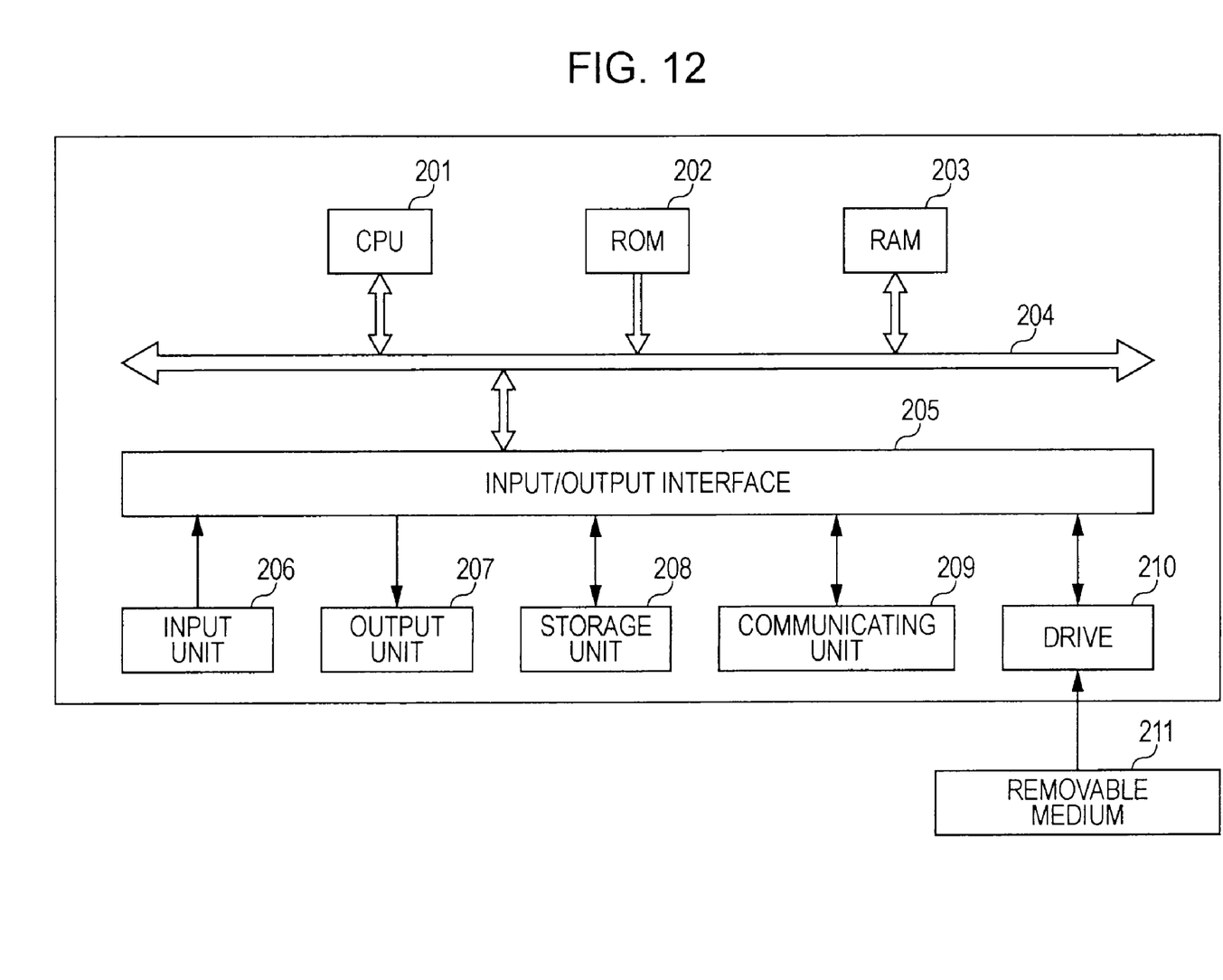
FIG. 12 is a block diagram illustrating an example of a hardware configuration of a personal computer.

FIG. 12 is a block diagram illustrating an example of a hardware configuration of a personal computer that executes the above-described series of processing steps in accordance with a program.

The computer includes a CPU 201, a read-only memory (ROM) 202, and a random-access memory (RAM) 203 that are connected to each other via a bus 204.

An input/output interface 205 is also connected to the bus 204. Components connected to the input/output interface 205 include an input unit 206 including a keyboard, a mouse, and a microphone; an output unit 207 including a display and a speaker; a storage unit 208 including a hard disk and a non-volatile memory; a communicating unit 209 including a network interface; and a drive 210 configured to drive a removable medium 211, such as a magnetic disk, an optical disc, a magneto-optical disc, or a semiconductor memory.

In the computer configured as described above, the series of processing steps described above is performed when the CPU 201 loads a program stored, for example, in the storage unit 208 into the RAM 203 via the input/output interface 205 and the bus 204, and executes the loaded program.

The program executed by the computer (or the CPU 201) may be recorded on the removable medium 211 which is a package medium, such as a magnetic disk (including a flexible disk), an optical disc (such as a compact disc-read-only memory (CD-ROM) or a DVD), a magneto-optical disc, or a semiconductor memory; or may be provided via a wired or wireless transmission medium, such as a local area network, the Internet, or digital satellite broadcasting.

The program can be installed in the storage unit 208 via the input/output interface 205 by mounting the removable medium 211 on the drive 210. Alternatively, the program may be received by the communicating unit 209 via a wired or wireless transmission medium and installed in the storage unit 208. Alternatively, the program may be installed in the ROM 202 or the storage unit 208 in advance.

The program executed by the computer may be a program including processing steps which are performed in time series in the order described in the present specification, or may be a program including processing steps which are performed in parallel or at necessary timing, such as when the program is called.

In the present specification, a system refers to the entire apparatus including a plurality of devices.

The present application contains subject matter related to that disclosed in Japanese Priority Patent Application JP 2008-189393 filed in the Japan Patent Office on Jul. 23, 2008, the entire content of which is hereby incorporated by reference.

Embodiments of the present invention are not limited to those described above, and various changes can be made without departing from the scope of the present invention.

What is claimed is:

1. A control device comprising:
   n optical pickups, n being an integer greater than one;
   dividing means for dividing one block into n pieces of data, the one block being a predetermined amount of data; and
   control means for controlling the n optical pickups to execute a recording process, in which at least one of the n optical pickups is performing recording during the entire recording process and any one of the n optical pickups only performs recording during a portion of the recording process, by recording the n pieces of data obtained by the dividing means on a predetermined recording medium serially in a radial direction.

2. The control device according to claim 1, wherein the control means performs control such that the optical pickup that has recorded one of the n pieces of data, the one being located at the end of the one block, records a piece of data located at the beginning of the subsequent block in a continuous manner.

3. The control device according to claim 1, wherein n is an integer of two, and two optical pickups are mounted on one optical head.

4. The control device according to claim 1, wherein n is an integer of four, and two optical heads, on each of which two optical pickups are mounted, are arranged at positions facing each other.

5. A control method for controlling a control device that controls n optical pickups, n being an integer greater than one, the control method comprising the steps of:
   dividing one block into n pieces of data, the one block being a predetermined amount of data; and
   controlling the n optical pickups to execute a recording process, in which at least one of the n optical pickups is performing recording during the entire recording process and any one of the n optical pickups only performs recording during a portion of the recording process, by recording the n pieces of data on a predetermined recording medium serially in a radial direction.

6. A non-transitory computer-readable medium having stored thereon a program causing a control device that controls n optical pickups, n being an integer greater than one, to execute processing comprising the steps of:
   dividing one block into n pieces of data, the one block being a predetermined amount of data; and
   controlling the n optical pickups to execute a recording process, in which at least one of the n optical pickups is performing recording during the entire recording process and any one of the n optical pickups only performs recording during a portion of the recording process, by recording the n pieces of data on a predetermined recording medium serially in a radial direction.

7. A non-transitory computer readable recording medium recording a computer-readable program causing a control device that controls n optical pickups, n being an integer greater than one, to execute processing comprising the steps of:
   dividing one block into n pieces of data, the one block being a predetermined amount of data; and
   controlling the n optical pickups to execute a recording process, in which at least one of the n optical pickups is performing recording during the entire recording process and any one of the n optical pickups only performs recording during a portion of the recording process, by recording the n pieces of data on a predetermined recording medium serially in a radial direction.

8. A control device comprising:
   n optical pickups, n being an integer greater than one;
   a dividing unit configured to divide one block into n pieces of data, the one block being a predetermined amount of data; and
   a control unit configured to control the n optical pickups to execute a recording process, in which at least one of the n optical pickups is performing recording during the entire recording process and any one of the n optical pickups only performs recording during a portion of the recording process, by recording the n pieces of data obtained by the dividing unit on a predetermined recording medium serially in a radial direction.

\* \* \* \* \*